United States Patent
Sahoo et al.

(10) Patent No.: US 12,047,473 B2
(45) Date of Patent: *Jul. 23, 2024

(54) ROUTING OF WEB REQUESTS TO ON-PREMISE NETWORK IN A MULTI-TENANT ENVIRONMENT

(71) Applicant: Oracle International Corporation, Redwood Shores, CA (US)

(72) Inventors: Sanjeeb Kumar Sahoo, Fremont, CA (US); Jagwinder Singh Brar, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,326

(22) Filed: Jun. 13, 2023

(65) Prior Publication Data

US 2023/0328152 A1  Oct. 12, 2023

Related U.S. Application Data

(63) Continuation of application No. 17/387,819, filed on Jul. 28, 2021, now Pat. No. 11,722,580, which is a continuation of application No. 17/083,533, filed on Oct. 29, 2020, now Pat. No. 11,108,884.

(51) Int. Cl.
*H04L 67/60* (2022.01)
*H04L 67/1004* (2022.01)

(52) U.S. Cl.
CPC .......... *H04L 67/60* (2022.05); *H04L 67/1004* (2013.01)

(58) Field of Classification Search
CPC . H04L 67/60; H04L 67/1004; H04L 67/1027; H04L 67/563; H04L 67/10
See application file for complete search history.

(56) References Cited

U.S. PATENT DOCUMENTS

| 10,963,294 | B2 | 3/2021 | Fornash et al. |
| 11,108,884 | B1 | 8/2021 | Sahoo et al. |
| 2017/0171179 | A1 | 6/2017 | Buendgen et al. |

(Continued)

OTHER PUBLICATIONS

U.S. Appl. No. 17/083,533, "Notice of Allowance", Apr. 30, 2021, 11 pages.

(Continued)

*Primary Examiner* — Benjamin M Thieu
(74) *Attorney, Agent, or Firm* — Kilpatrick Townsend & Stockton LLP

(57) ABSTRACT

When a cloud services provider infrastructure (CSPI) receives a request from an administrator to perform an operation on an appliance, a load balancer may select a first server within the CSPI to process the request. If the first server does not have a connection with the appliance, the first server may generate a redirect response that includes server identification information identifying a particular server having a pre-established connection with the appliance. The first server may send the redirect response to the application that the administrator used to send the request. The application may then generate a second request that includes the server identification information, and send the second request to the CSPI. A load balancer in the CSPI may then forward the second request to the particular server, and the particular server may use the pre-established connection to send a request to the appliance requesting performance of the operation.

20 Claims, 9 Drawing Sheets

(56) References Cited

U.S. PATENT DOCUMENTS

| | | |
|---|---|---|
| 2019/0158605 A1 | 5/2019 | Markuze et al. |
| 2021/0034398 A1 | 2/2021 | Khandkar et al. |
| 2021/0092182 A1 | 3/2021 | Liguori et al. |

OTHER PUBLICATIONS

U.S. Appl. No. 17/387,819 , "Non-Final Office Action", Oct. 6, 2022, 6 pages.

U.S. Appl. No. 17/387,819 , "Notice of Allowance", Mar. 1, 2023, 8 pages.

ROUTING OF WEB REQUESTS TO ON-PREMISE NETWORK IN A MULTI-TENANT ENVIRONMENT

CROSS REFERENCE TO RELATED APPLICATIONS

This application is a Continuation of U.S. application Ser. No. 17/387,819, filing date Jul. 28, 2021, which is a Continuation of U.S. application Ser. No. 17/083,533, filing date Oct. 29, 2020, the disclosure of each which are incorporated here by reference for all purposes.

TECHNICAL FIELD

The present disclosure relates generally to routing Web requests to on-premise network appliances in a cloud service having a multi-tenant environment.

BACKGROUND

The term "cloud service" is generally used to refer to a service that is made available by a cloud services provider (CSP) to users or customers on demand (e.g., via a subscription model) using systems and infrastructure (cloud infrastructure) provided by the cloud services provider. Typically, the servers and systems that make up the CSP's infrastructure are separate from the customer's own on-premise servers and systems. Customers can thus avail themselves of cloud services provided by a CSP without having to purchase separate hardware and software resources for the services. There are various different types or models of cloud services including Software-as-a-Service (SaaS), Platform-as-a-Service (PaaS), Infrastructure-as-a-Service (IaaS), and others. Cloud services are designed to provide easy, scalable access to applications, resources, and services.

A customer can subscribe to one or more cloud services provided by a CSP. A customer is any entity that subscribes to a cloud service provided by the CSP. A customer can subscribe to one or more cloud services including services of different types including SaaS, PaaS, IaaS, and other types of cloud services. When a customer subscribes to or registers for a service provided by a CSP, a tenancy or an account is created for that customer. The customer has access to this account and can use it to access cloud resources associated with the account.

A CSP may provide services under an IaaS model, wherein the CSP provides infrastructure (referred to as cloud services provider infrastructure or CSPI) that can be used by customers to build their own customizable networks and deploy customer resources. The CPSI may comprise interconnected high-performance compute resources including various host machines, memory resources, and network resources that form a physical network, which is also referred to as a substrate network or an underlay network. The physical network provides the underlying basis for creating one or more virtual or overlay networks on top of the physical network. These virtual or overlay networks (also referred to as software-based or -defined networks) are implemented using software virtualization technologies to create layers of network abstraction that can be run on top of the physical network. Overlay networks can take on many forms, including peer-to-peer networks, IP networks, virtual Local Area Networks (vLANs), and others. The CSPI provides infrastructure and a set of complementary cloud services that enable customers to build and run a wide range of applications and services in a highly available hosted environment. The CSPI offers high-performance compute resources and capabilities and storage capacity in a flexible overlay virtual network that is securely accessible from various networked locations such as from a customer's on-premises network.

When a customer subscribes to or registers for an IaaS service provided by a CSP, the tenancy created for that customer is a secure and isolated partition within the CSPI where the customer can create, organize, and administer their cloud resources. From the CSP's perspective, resources provided by the CSP and used to provide services to the CSP's customers can be single tenancy or multi-tenancy. In certain embodiments, a single tenancy is when a single instance of software and supporting infrastructure serves a single customer and provides them their own independent set of resources that are not shared with another customer or tenant. In contrast, multi-tenancy is when a single instance of the software and its supporting infrastructure serves multiple customers or tenants. In a multi-tenancy situation, the CSP takes precautions to ensure that each tenant's data is isolated and remains invisible to other tenants.

BRIEF SUMMARY

The present disclosure relates generally to routing Web requests originating from the Internet to on-premise network appliances managed by a multi-tenant service hosted in the cloud. More particularly, techniques are described for allowing customers of a multi-tenant cloud service to control and/or manage customer appliances that are running on customer premises. Various embodiments are described herein, including methods, systems, non-transitory computer-readable storage media storing programs, code, or instructions executable by one or more processors, and the like.

A multi-tenant cloud service may provide services to a plurality of customers, each of whom may run various appliances on their own premises. An administrator for a customer may want to control or manage one of the appliances. However, the customer network may include a firewall that prevents incoming communications to the appliances, such that a cloud services provider infrastructure (CSPI) cannot initiate a connection with the appliances.

Accordingly, exemplary embodiments may initiate a connection from an appliance in a customer data center, and establish a connection between the appliance and an endpoint in the CSPI. The endpoint in the CSPI may be a server that is selected by a load balancer in the CSPI. Information about the connection may be stored in a connections table.

Later, when the CSPI receives a request from an administrator for the customer to perform an operation on the appliance, the load balancer may select a first server within the CSPI to process the request. The first server may refer to the connections table to identify a particular server that has a pre-established connection with the appliance. If the first server has a connection with the appliance, the first server may send a request to the appliance requesting performance of the operation. However, if the first server does not have a connection with the appliance, the first server may generate a redirect response that includes server identification information identifying the particular server having the pre-established connection with the appliance. The first server may send the redirect response to the application that the administrator used to send the request. The application may then generate a second request that includes the server identification information, and send the second request to the CSPI. A load balancer in the CSPI may then forward the second request to the particular server identified in the server identification information as having the pre-established connection with the appliance. The particular server may then use the pre-established connection to send a request to the appliance requesting performance of the operation.

The method described above provides a scalable and secure way to route customer requests for controlling or managing on-premises network appliances that are managed by a multi-tenant cloud service. The method described above is scalable because more servers may be added if the load increases. Further, the method described above is secure because the servers are behind at least one load balancer.

In certain embodiments, a method includes receiving, at a cloud service provider infrastructure (CSPI), a first request to perform a first operation on a first appliance in a first data center. The CSPI includes one or more computing systems and a plurality of servers. The method also includes selecting, by a computing system of the one or more computing systems within the CSPI, a first server from the plurality of servers for processing the first request; and determining, by the first server, that a first connection exists between a first particular server from the plurality of servers and the first appliance at the first data center. The first particular server is different from the first server. In addition, the method includes generating, by the first server, a first response for the first request. The first response includes first server identification information, and the first server identification information identifies the first particular server. Further, the method includes using the first response to be communicated in response to the first request. The method also includes, responsive to the first response, receiving, by the CSPI, a second request including the first server identification information. In addition, the method includes forwarding the second request to the first particular server based upon the first server identification information in the second request. Further, the method includes communicating, from the first particular server to the first appliance and using the first connection established between the first particular server and the first appliance, first information requesting performance of the first operation at the first appliance.

The first data center may be an on-premise data center of a first customer, and the first customer may subscribe to one or more services provided using the CSPI. The selecting may include selecting, by a load balancer executed by the computing system, the first server from the plurality of servers by using a load balancing technique. The forwarding of the second request to the first particular server may include selecting, by the load balancer, the first particular server for processing the second request based upon the first server identification information in the second request.

The determining may include accessing, by the first server, connections information identifying a set of one or more connections between one or more servers of the plurality of servers and one or more appliances at one or more data centers. The first connection may be established responsive to a connection request received by the CSPI from the first appliance to open a connection between the first appliance and the CSPI. The first server identification information may include information identifying a path to the first particular server.

The causing may include communicating the first response from the first server to an application that sent the first request. The application may be executed by a device that is outside the CSPI. The second request may be received from the application. The method may also include performing the first operation at the first appliance at the first data center.

The method may also include receiving, at the CSPI, a third request to perform a second operation on a second appliance in a second data center. The first data center may be with a first customer and the second data center may be associated with a second customer different from the first customer. In addition, the method may include selecting, by the computing system within the CSPI, a second server from the plurality of servers for processing the third request; determining, by the second server, that a second connection exists between the first particular server from the plurality of servers and the second appliance at the second data center; and generating, by the second server, a second response to the third request. The second response may include second server identification information, and the second server identification information may identify the first particular server. Further, the method may include causing the second response to be communicated in response to the third request. The method may also include, responsive to the second response, receiving, by the CSPI, a fourth request including the second server identification information included in the second response. In addition, the method may include forwarding the fourth request to the first particular server based upon the second server identification information in the fourth request. Further, the method may include communicating, from the first particular server to the second appliance at the second data center and using the second connection established between the first particular server and the second appliance at the second data center, second information requesting performance of the second operation at the second appliance at the second data center. The method may also include performing the second operation at the second appliance at the second data center.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

As discussed above, the present disclosure relates generally to routing customer requests for controlling or managing on-premises network appliances that are managed by a multi-tenant cloud service. Exemplary embodiments may initiate a connection from an appliance in a customer data center, and establish a connection between the appliance and an endpoint in the CSPI. The endpoint in the CSPI may be a server that is selected by a load balancer in the CSPI. Information about the connection may be stored in a connections table.

Later, when the CSPI receives a request from an administrator for the customer to perform an operation on the appliance, the load balancer may select a first server within the CSPI to process the request. The first server may refer to the connections table to identify a particular server that has a pre-established connection with the appliance. If the first server has a connection with the appliance, the first server may send a request to the appliance requesting performance of the operation. However, if the first server does not have a connection with the appliance, the first server may generate a redirect response that includes server identification information identifying the particular server having the pre-established connection with the appliance. The first server may send the redirect response to the application that the administrator used to send the request. The application may then generate a second request that includes the server identification information, and send the second request to the CSPI. A load balancer in the CSPI may then forward the second request to the particular server identified in the server identification information as having the pre-established connection with the appliance. The particular server may then use the pre-established connection to send a request to the appliance requesting performance of the operation.

Figure 1:
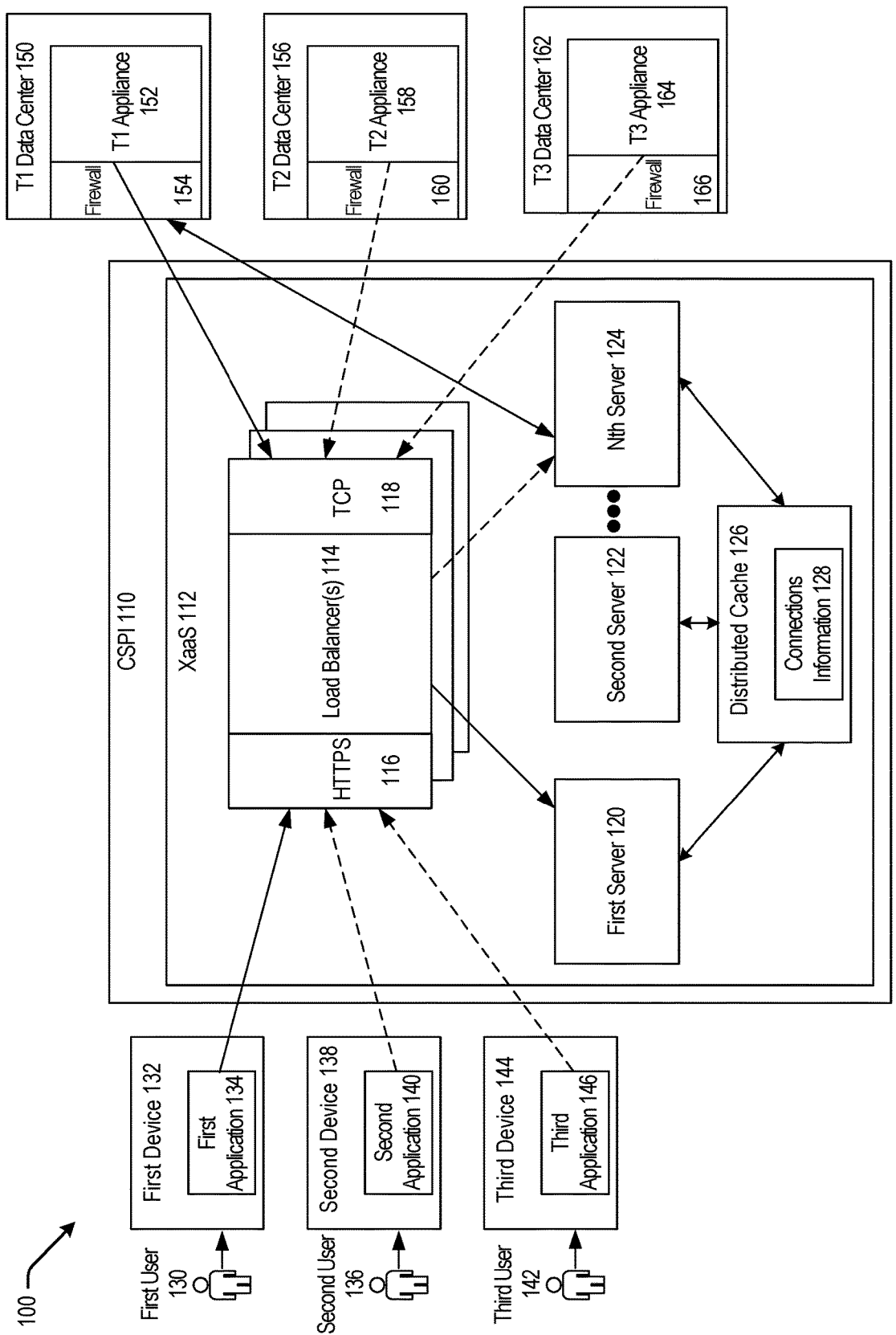
FIG. 1 shows a simplified block diagram of a system incorporating an exemplary embodiment.

FIG. 1 shows a simplified block diagram of a system 100 incorporating an exemplary embodiment. The system 100 may include a cloud services provider infrastructure (CSPI) 110, which may include interconnected high-performance compute resources including various host machines, memory resources, and network resources that form a physical network, which is also referred to as a substrate network or an underlay network. The resources in the CSPI 110 may be spread across one or more data centers that may be geographically spread across one or more regions. The physical network provides the underlying basis for creating one or more virtual or overlay networks on top of the physical network. These virtual or overlay networks (also referred to as software-based or -defined networks) are implemented using software virtualization technologies to create layers of network abstraction that can be run on top of the physical network. Overlay networks can take on many forms, including peer-to-peer networks, IP networks, virtual Local Area Networks (vLANs), and others. Overlay networks typically use Layer-3 IP addressing with endpoints designated by their virtual IP addresses. This method of overlay networking is often referred to as virtual Layer 3 networking. Examples of protocols developed for overlay networks include IP, Virtual Extensible LAN (VXLAN—IETF RFC 7348), Virtual Private Networks (VPNs), VMware's NSX, and others. The CSPI 110 provides infrastructure and a set of complementary cloud services that enable customers to build and run a wide range of applications and services in a highly available hosted environment. The CSPI 110 offers high-performance compute resources and capabilities and storage capacity in a flexible overlay virtual network that is securely accessible from various networked locations such as from a customer's on-premises network.

One or more virtual cloud networks (VCNs) can be set up using the CSPI 110. A VCN is a virtual or software defined private network. For example, a customer subscribing to XaaS 112 can set up a private VCN using the CSPI 110. The customer may set up one or more VCNs to deploy applications such as compute instances (e.g., virtual machines, containers, bare-metal instances) and other resources. A compute instance deployed on a VCN can communicate with public endpoints over a public network such as the Internet, with other instances in the same VCN or other VCNs, with the customer's on-premise data centers or networks, and with other types of endpoints such as service endpoints. The XaaS 112 may include Software-as-a-Service (SaaS), Platform-as-a-Service (PaaS), Infrastructure-as-a-Service (IaaS), and others.

The CSPI 110 may include one or a plurality of load balancers 114. The load balancers 114 may be implemented by one or more computing systems within the CSPI 110. For example, the load balancers 114 may be implemented as software that is executed by a computing system within the CSPI 110. Each of the load balancers 114 may include an HTTPS listener 116 that may receive communications from customers. For example, a first user 130 may cause a first application 134 running on a first device 132 to send requests to the load balancers 114 via the HTTPS listener 116. Similarly, a second user 136 may cause a second application 140 running on a second device 138 to send requests to the load balancers 114 via the HTTPS listener 116. Likewise, a third user 142 may cause a third application 146 running on a third device 144 to send requests to the load balancers 114 via the HTTPS listener 116. Each of the first user 130, the second user 136, and the third user 142 may be an administrator for a respective customer. Each of the first device 132, the second device 138, and the third device 144 may be a portable handheld device (e.g., an iPhone®, a cellular telephone, an iPad®, a computing tablet, a personal digital assistant (PDA)), a wearable device (e.g., a Google Glass® head mounted display), a general purpose personal computer (e.g., personal computers and/or laptop computers), a workstation computer, or any other electronic device, such as a thin-client computer, an Internet-enabled gaming system (e.g., a Microsoft Xbox gaming console with or without a Kinect® gesture input device), and/or a personal messaging device. Each of the first application 134, the second application 140, and the third application 146 may be a software application or operating system such as Microsoft Windows®, Apple Macintosh®, UNIX® or UNIX-like operating systems, Linux or Linux-like operating systems such as Google Chrome™ OS, and/or a variety of mobile operating systems such as Microsoft Windows Mobile®, iOS®, Windows Phone®, Android™, BlackBerry®, Palm OS®, and the like.

Each of the load balancers 114 may also include a TCP listener 118 that may receive communications from on-premise data centers for each of the customers. For example, a T1 appliance 152 in a T1 data center 150 may send connection requests to the load balancers 114 via the TCP listener 118 using SSL protocol. Similarly, a T2 appliance 158 in a T2 data center 156 may send connection requests to the load balancers 114 via the TCP listener 118 using SSL protocol. Likewise, a T3 appliance 164 in a T3 data center 162 may send connection requests to the load balancers 114 via the TCP listener 118 using SSL protocol. Each of the T1 data center 150, the T2 data center 156, and the T3 data center 162 may be a private data center having its own servers, devices, etc. for a different tenant of the CSPI 110. In some examples, the T1 data center 150 may be an on-premise data center for the customer associated with the first user 130, the T2 data center 156 may be an on-premise data center for the customer associated with the second user 136, and the T3 data center 162 may be an on-premise data center for the customer associated with the third user 142. The T1 data center 150 may have a firewall 154 that prevents incoming communications from reaching the T1 appliance 152. Similarly, the T2 data center 156 may have a firewall 160 that prevents incoming communications from reaching the T2 appliance 158. Likewise, the T3 data center 162 may have a firewall 166 that prevents incoming communications from reaching the T3 appliance 164. Each of the T1 appliance 152, the T2 appliance 158, and the T3 appliance 164 may be a device or a virtual machine.

The CSPI 110 may also include a plurality of servers, such as a first server 120, a second server 122, and an Nth server 124. Although only three servers are shown, any suitable number of servers may be provided. In some embodiments the servers may be compute instances such as virtual machines. Each of the first server 120, the second server 122, and the Nth server 124 may receive messages from the load balancers 114 and communicate with a distributed cache 126. For example, each of the first server 120, the second server 122, and the Nth server 124 may send and receive connections information 128, which may be stored as a table in the distributed cache 126. The connections information 128 may include information identifying the endpoints of each connection between the servers and the appliances. As described in further detail below, these connections may be initiated by the T1 appliance 152, the T2 appliance 158, and the T3 appliance 164 because the firewalls 154, 160, and 166 block incoming communication requests.

The system 100 depicted in FIG. 1 is merely an example and is not intended to unduly limit the scope of claimed embodiments. Many variations, alternatives, and modifications are possible. For example, in some implementations, the system 100 may have more or fewer systems or components than those shown in FIG. 1, may combine two or more systems, or may have a different configuration or arrangement of systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 2:
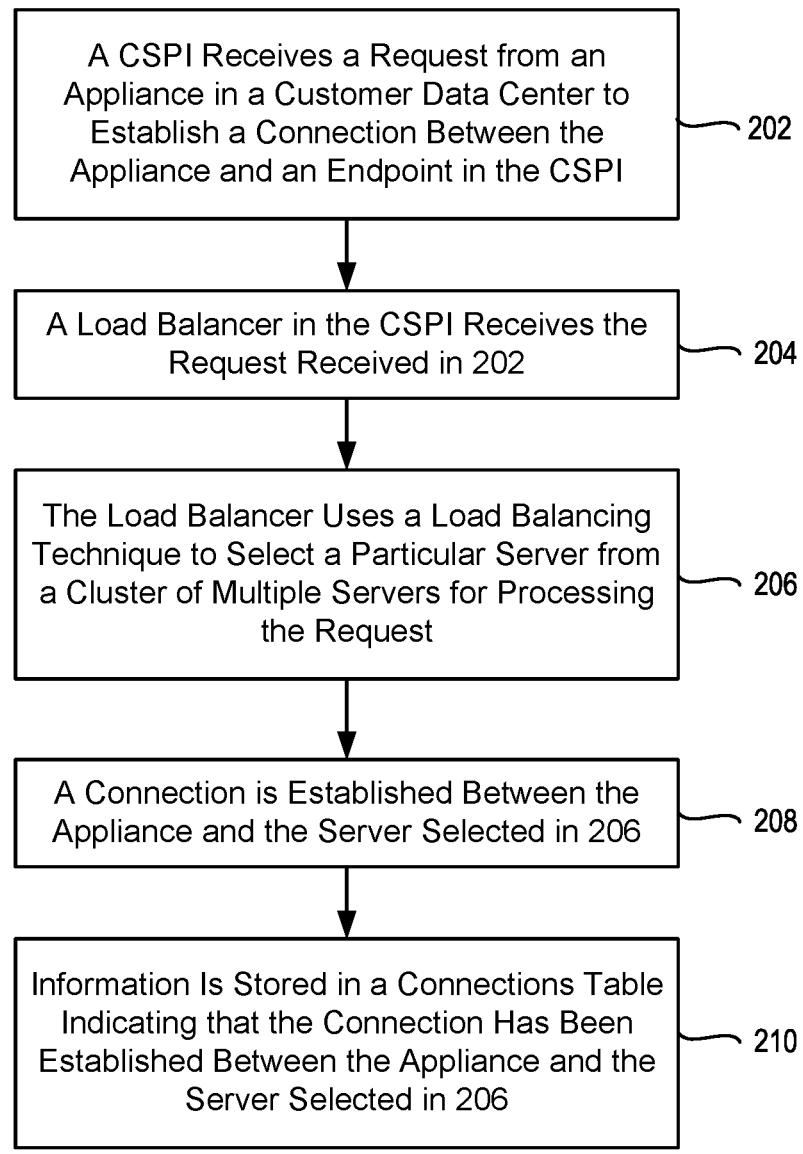
FIG. 2 shows a simplified flowchart depicting processing to establish a connection between an appliance in a customer data center and a server in a CSPI according to certain embodiments.

FIG. 2 shows a simplified flowchart 200 depicting processing to establish a connection between an appliance in a customer data center and a server in a CSPI according to certain embodiments. The processing depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel.

As shown in FIG. 2, at block 202 a CSPI may receive a request from an appliance in a customer data center to establish a connection between the appliance and an endpoint in the CSPI. Any suitable communications protocol may be used, such as WebSocket or SSL. For example, for the embodiment depicted in FIG. 1, the CSPI 110 may receive a request from the T1 appliance 152 in the T1 data center 150. The CSPI 110 may forward the request to one of the load balancers 114, and the load balancer 114 may receive the request at block 204. The load balancer 114 may use a load balancing technique to select a particular server from a cluster of multiple servers for processing the request at block 206. Any suitable load balancing technique may be used, such as a round robin technique. For example, the load balancer 114 may use a load balancing technique to select the first server 120, the second server 122, or the Nth server 124. A connection may then be established between the appliance and the selected server at block 208, responsive to the request received from the appliance. For example, a connection may be established between the T1 appliance 152 and the Nth server 124. Information may be stored in a connections table indicating that the connection has been established between the appliance and the selected server at block 210. In some embodiments, the information may be stored by the selected server. For example, information including the endpoints of the connection may be stored in the connections information 128 within the distributed cache 126. The first endpoint may be the T1 appliance 152 and the second endpoint may be the Nth server 124.

The method described in FIG. 2 may be repeated for a plurality of requests from a plurality of appliances in a plurality of customer data centers. Accordingly, a plurality of connections may be established between the plurality of appliances and the plurality of servers. For example, connections may be established between the T1 appliance 152 and any or all of the first server 120 through the Nth server 124. Similarly, connections may be established between the first server 120 and any or all of the T1 appliance 152 through the T3 appliance 164. The connections may be permanent or transitory, and the connections table may be updated when a connection is established or terminated.

Figure 3:
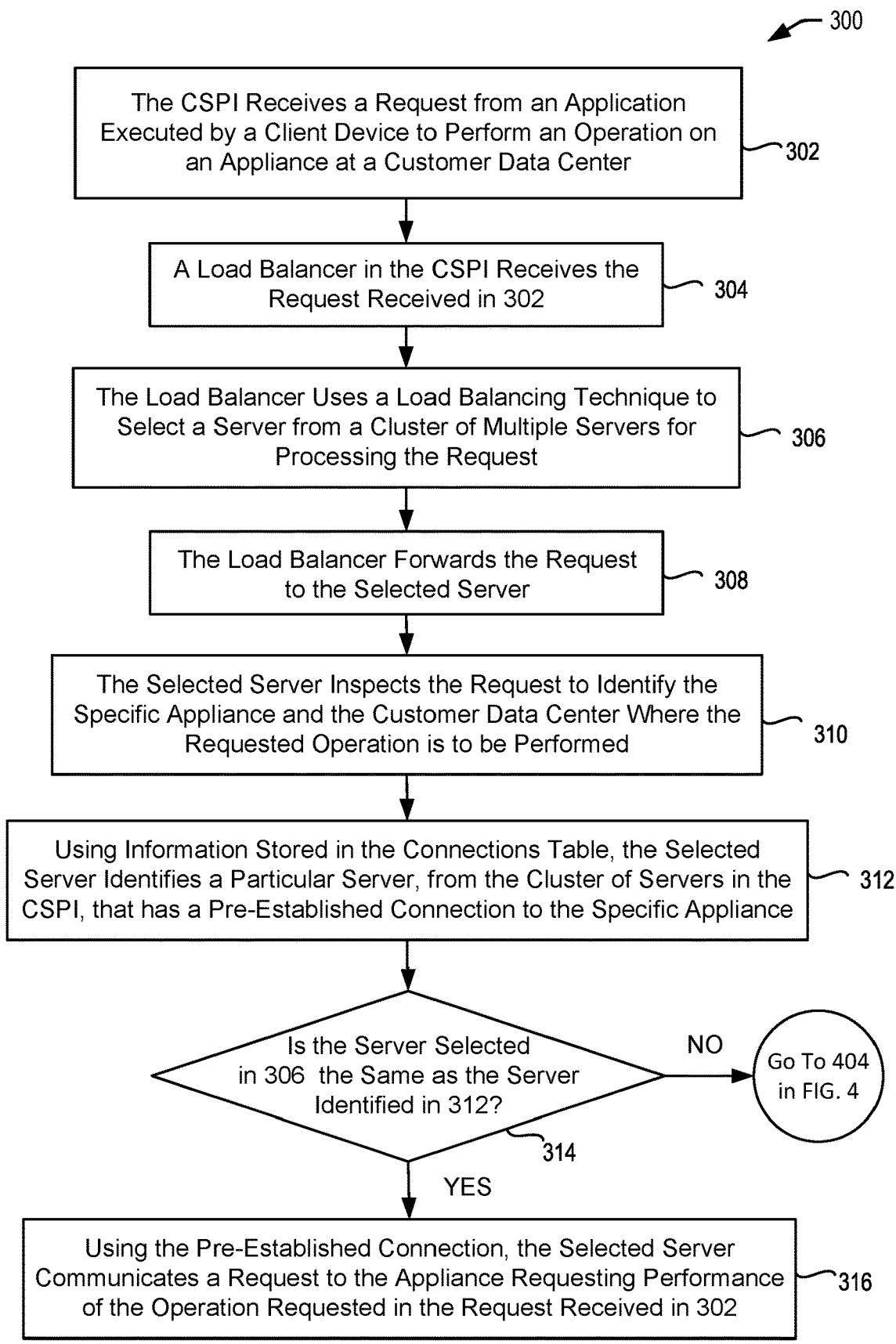
FIGS. 3 and 4 show a simplified flowchart depicting processing to communicate an operational request to an appliance according to certain embodiments.
Figure 4:
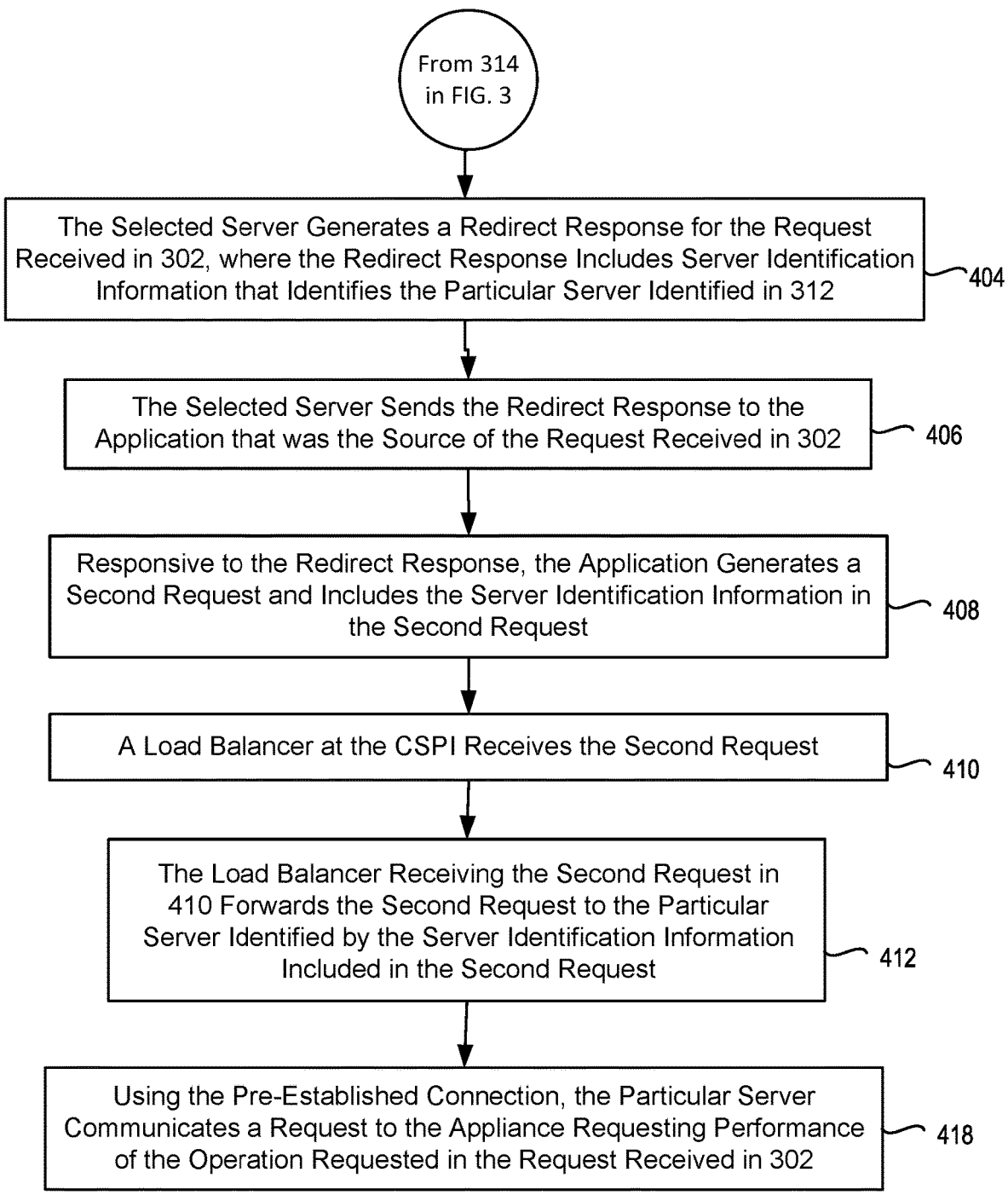

FIGS. 3 and 4 show a simplified flowchart 300 depicting processing to communicate an operational request to an appliance according to certain embodiments. The processing depicted in FIGS. 3 and 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 3 and 4 and described below is intended to be illustrative and non-limiting. Although FIGS. 3 and 4 depict the various processing steps occurring in a particular sequence or order, this is not intended to be limiting. In certain alternative embodiments, the processing may be performed in some different order or some steps may also be performed in parallel.

As shown in FIG. 3, at block 302 a CSPI may receive a request from an application executed by a client device to perform an operation on an appliance at a customer data center. In some embodiments the operation may include making a change to a configuration of the appliance (e.g., updating a version of appliance software), a maintenance operation to be performed at the appliance, etc. For example, for the embodiment depicted in FIG. 1, the CSPI 110 may receive a request from the first application 134 running on the first device 132 to perform an operation on the T1 appliance 152 at the T1 data center 150. The CSPI 110 may forward the request to one of the load balancers 114, and the load balancer 114 may receive the request at block 304. The load balancer 114 may use a load balancing technique to select a server from a cluster of multiple servers for processing the request at block 306. Any suitable load balancing technique may be used, such as a round robin technique. For example, the load balancer 114 may use a load balancing technique to select the first server 120, the second server 122, or the Nth server 124. The load balancer 114 may then forward the request to the selected server at block 308. For example, the load balancer 114 may forward the request to the first server 120.

At block 310 the selected server may inspect the request to identify the specific appliance and the customer data center where the requested operation is to be performed. For example, the first server 120 may inspect the request to determine that the requested operation is to be performed on the T1 appliance 152 at the T1 data center 150. At block 312 the selected server may use information stored in the connections table to identify a particular server from the cluster of servers in the CSPI that has a pre-established connection with the specific appliance. For example, the first server 120 may use the connections information 128 stored in the distributed cache 126 to identify the first server 120, the second server 122, or the Nth server 124 as having a pre-established connection with the T1 appliance 152. In the present example, the Nth server 124 has the pre-established connection with the T1 appliance 152 as described above with respect to FIG. 2.

At block 314 it may be determined if the server selected at block 306 is the same as the particular server identified at block 312. If the servers are the same, the selected server may use the pre-established connection at block 316 to communicate a request to the appliance requesting performance of the operation requested in the request received at block 302. For example, if the Nth server 124 is selected as the server at block 306 and is identified as having a pre-established connection to the T1 appliance 152 at block 312, then the Nth server 124 may use the pre-established connection to communicate a request to the T1 appliance 152 requesting performance of the operation requested in the request received at block 302. The T1 appliance 152 may then perform the requested operation. However, in this example, because the first server 120 is selected as the server at block 306 while the Nth server 124 has the pre-established connection with the T1 appliance 152, the processing continues at block 404.

As shown in FIG. 4, at block 404 the selected server may generate a redirect response for the request received at block 302. The redirect response may be an HTTP 302 message. The redirect response may include server identification information that identifies the particular server identified at block 312. For example, the first server 120 may generate a redirect response that includes server identification information that identifies a path in which the Nth server 124 has the pre-established connection with the T1 appliance 152. At block 406 the selected server may then send the redirect response to the application that was the source of the request received at block 302. For example, the first server 120 may send the redirect response to the first application 134.

After receiving the redirect response, the application may generate a second request that includes the server identification information at block 408. For example, the first application 134 may generate a second request that includes the server identification information indicating that the Nth server 124 has the pre-established connection with the T1 appliance 152. A load balancer at the CSPI may receive the second request at block 410. For example, the load balancer 114 at the CSPI 110 may receive the second request from the first application 134. The load balancer receiving the second request may then forward the second request to the particular server identified by the server identification information at block 412. For example, the load balancer 114 may forward the second request to the Nth server 124. At block 418 the particular server may then use the pre-established connection to communicate a request to the appliance requesting performance of the operation requested in the request received at block 302. For example, the Nth server 124 may use the pre-established connection to communicate a request to the T1 appliance 152 requesting performance of the operation requested in the request received from the first application 134 at block 302. The T1 appliance 152 may then perform the requested operation.

The method described in FIGS. 3 and 4 may be repeated for a plurality of requests from a plurality of applications executed by a plurality of client devices. For example, the CSPI 110 may receive an additional request from the second application 140 running on the second device 138 to perform an operation on the T2 appliance 158 at the T2 data center 156 at block 302. As discussed above, the T2 data center 156 may be an on-premise data center for the customer associated with the second user 136, while the T1 data center 150 may be an on-premise data center for the customer associated with the first user 130. The CSPI 110 may forward the additional request to one of the load balancers 114, and the load balancer 114 may receive the additional request at block 304. The load balancer 114 may use a load balancing technique to select a server at block 306. The selected server may be the same server or a different server than the server that was selected in previous operations of block 306. The load balancer 114 may then forward the additional request to the selected server at block 308. For example, the load balancer 114 may forward the additional request to the second server 122.

At block 310 the second server 122 may inspect the additional request to determine that the requested operation is to be performed on the T2 appliance 158 at the T2 data center 156. At block 312 the second server 122 may use the connections information 128 stored in the distributed cache 126 to identify the first server 120, the second server 122, or the Nth server 124 as having a pre-established connection with the T2 appliance 158. The identified server may be the same server or a different server than the particular server that was identified in previous operations of block 312. In one example, the Nth server 124 also has a pre-established connection with the T2 appliance 158. At block 314 it may be determined that the second server 122 selected as the server at block 306 is different from the Nth server 124 having the pre-established connection with the T2 appliance 158, which causes the processing to continue at block 404.

At block 404 the second server 122 may generate a redirect response that includes server identification information that identifies a path in which the Nth server 124 has the pre-established connection with the T2 appliance 158. At block 406 the second server 122 may send the redirect response to the second application 140. After receiving the redirect response, the second application 140 may generate another request that includes the server identification information indicating that the Nth server 124 has the pre-established connection with the T2 appliance 158 at block 408. The load balancer 114 at the CSPI 110 may receive the request from the second application 140 at block 410, and may forward the request to the Nth server 124 at block 412. At block 418 the Nth server 124 may use the pre-established connection to communicate yet another request to the T2 appliance 158 requesting performance of the operation requested in the additional request received from the second application 140 at block 302. The T2 appliance 158 may then perform the requested operation.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
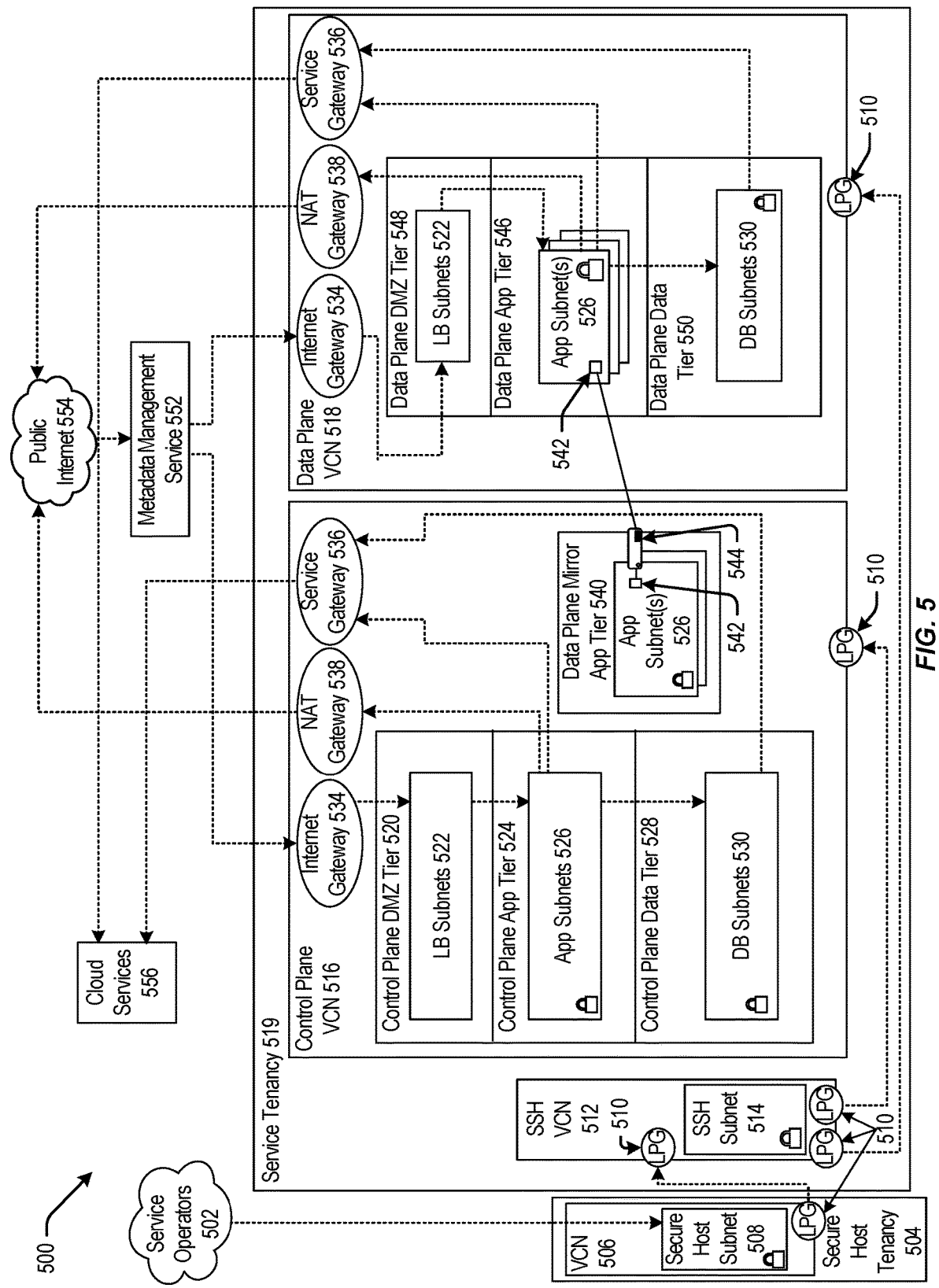
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep security breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plan VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Memory that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of security, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
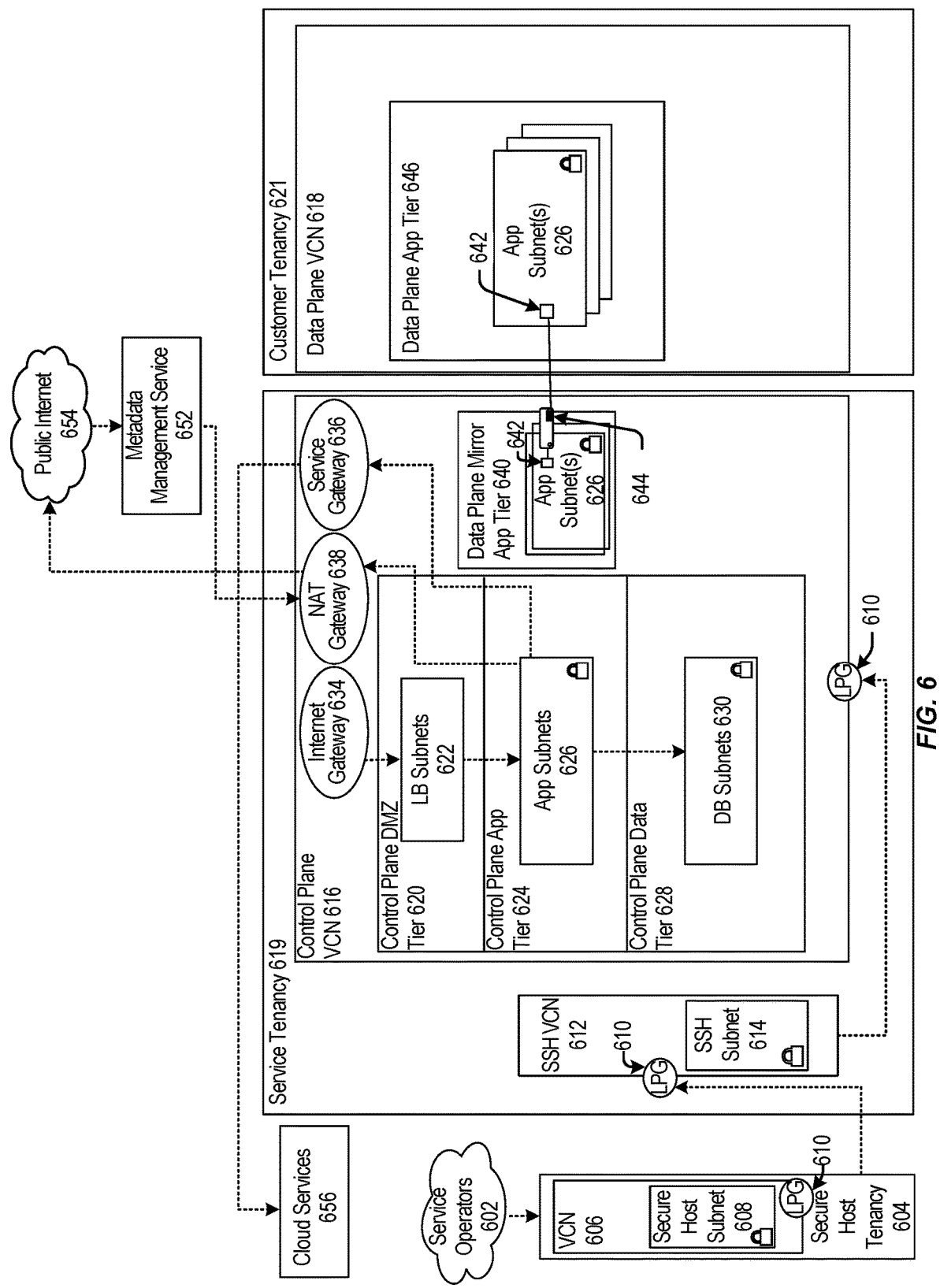
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 502 of FIG. 5) can be communicatively coupled to a secure host tenancy 604 (e.g. the secure host tenancy 504 of FIG. 5) that can include a virtual cloud network (VCN) 606 (e.g. the VCN 506 of FIG. 5) and a secure host subnet 608 (e.g. the secure host subnet 508 of FIG. 5). The VCN 606 can include a local peering gateway (LPG) 610 (e.g. the LPG 510 of FIG. 5) that can be communicatively coupled to a secure shell (SSH) VCN 612 (e.g. the SSH VCN 512 of FIG. 5) via an LPG 510 contained in the SSH VCN 612. The SSH VCN 612 can include an SSH subnet 614 (e.g. the SSH subnet 514 of FIG. 5), and the SSH VCN 612 can be communicatively coupled to a control plane VCN 616 (e.g. the control plane VCN 516 of FIG. 5) via an LPG 610 contained in the control plane VCN 616. The control plane VCN 616 can be contained in a service tenancy 619 (e.g. the service tenancy 519 of FIG. 5), and the data plane VCN 618 (e.g. the data plane VCN 518 of FIG. 5) can be contained in a customer tenancy 621 that may be owned or operated by users, or customers, of the system.

The control plane VCN 616 can include a control plane DMZ tier 620 (e.g. the control plane DMZ tier 520 of FIG. 5) that can include LB subnet(s) 622 (e.g. LB subnet(s) 522 of FIG. 5), a control plane app tier 624 (e.g. the control plane app tier 524 of FIG. 5) that can include app subnet(s) 626 (e.g. app subnet(s) 526 of FIG. 5), a control plane data tier 628 (e.g. the control plane data tier 528 of FIG. 5) that can include database (DB) subnet(s) 630 (e.g. similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g. the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g. the service gateway of FIG. 5) and a network address translation (NAT) gateway 638 (e.g. the NAT gateway 538 of FIG. 5). The control plane VCN 616 can include the service gateway 636 and the NAT gateway 638.

The control plane VCN 616 can include a data plane mirror app tier 640 (e.g. the data plane mirror app tier 540 of FIG. 5) that can include app subnet(s) 626. The app subnet(s) 626 contained in the data plane mirror app tier 640 can include a virtual network interface controller (VNIC) 642 (e.g. the VNIC of 542) that can execute a compute instance 644 (e.g. similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g. the data plane app tier 546 of FIG. 5) via the VNIC 642 contained in the data plane mirror app tier 640 and the VNIC 642 contained in the data plan app tier 646.

The Internet gateway 634 contained in the control plane VCN 616 can be communicatively coupled to a metadata management service 652 (e.g. the metadata management service 552 of FIG. 5) that can be communicatively coupled to public Internet 654 (e.g. public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g. cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
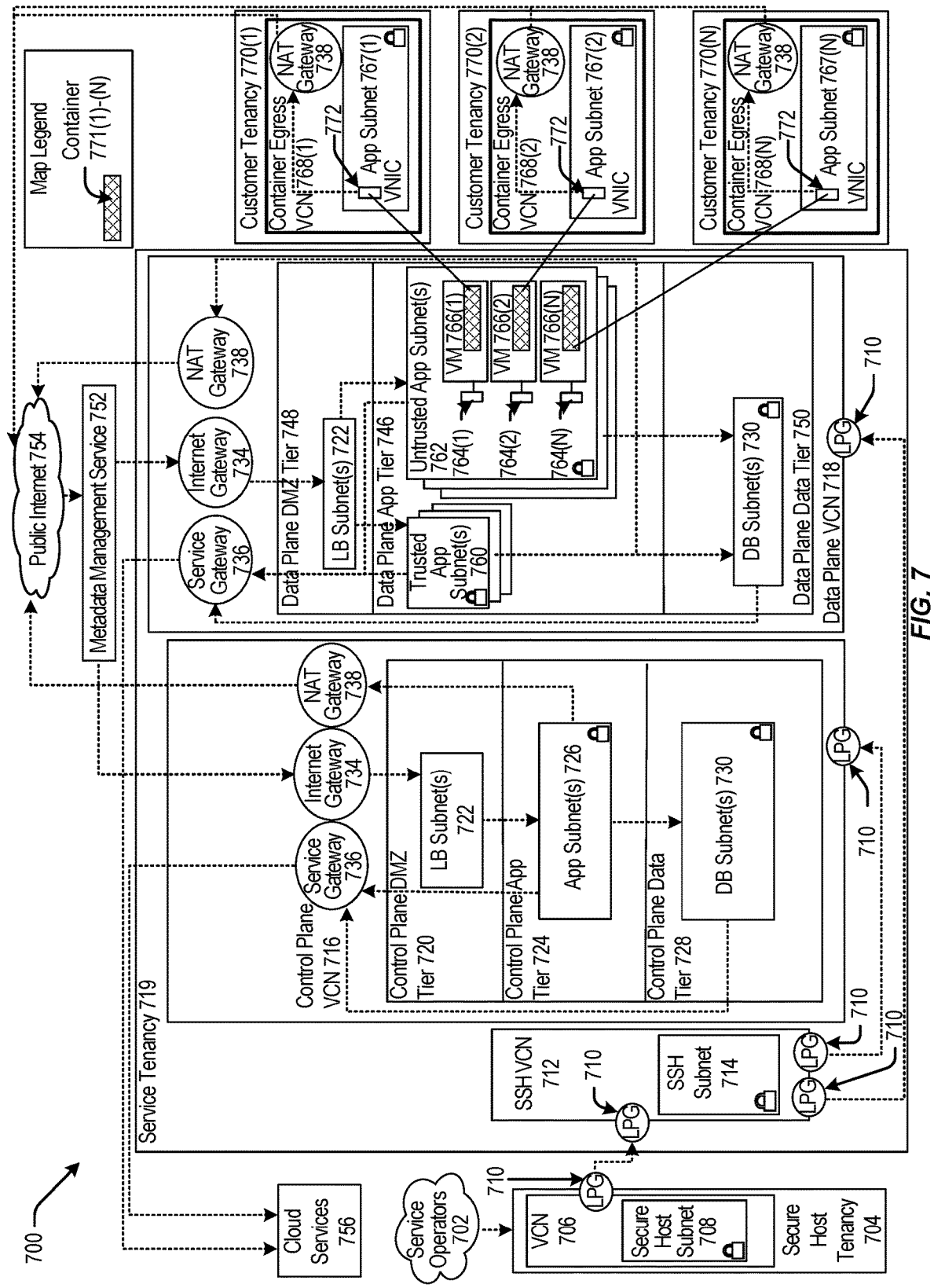
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 502 of FIG. 5) can be communicatively coupled to a secure host tenancy 704 (e.g. the secure host tenancy 504 of FIG. 5) that can include a virtual cloud network (VCN) 706 (e.g. the VCN 506 of FIG. 5) and a secure host subnet 708 (e.g. the secure host subnet 508 of FIG. 5). The VCN 706 can include an LPG 710 (e.g. the LPG 510 of FIG. 5) that can be communicatively coupled to an SSH VCN 712 (e.g. the SSH VCN 512 of FIG. 5) via an LPG 710 contained in the SSH VCN 712. The SSH VCN 712 can include an SSH subnet 714 (e.g. the SSH subnet 514 of FIG. 5), and the SSH VCN 712 can be communicatively coupled to a control plane VCN 716 (e.g. the control plane VCN 516 of FIG. 5) via an LPG 710 contained in the control plane VCN 716 and to a data plane VCN 718 (e.g. the data plane 518 of FIG. 5) via an LPG 710 contained in the data plane VCN 718. The control plane VCN 716 and the data plane VCN 718 can be contained in a service tenancy 719 (e.g. the service tenancy 519 of FIG. 5).

The control plane VCN 716 can include a control plane DMZ tier 720 (e.g. the control plane DMZ tier 520 of FIG. 5) that can include load balancer (LB) subnet(s) 722 (e.g. LB subnet(s) 522 of FIG. 5), a control plane app tier 724 (e.g. the control plane app tier 524 of FIG. 5) that can include app subnet(s) 726 (e.g. similar to app subnet(s) 526 of FIG. 5), a control plane data tier 728 (e.g. the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g. the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 5) and a network address translation (NAT) gateway 738 (e.g. the NAT gateway 538 of FIG. 5). The control plane VCN 716 can include the service gateway 736 and the NAT gateway 738.

The data plane VCN 718 can include a data plane app tier 746 (e.g. the data plane app tier 546 of FIG. 5), a data plane DMZ tier 748 (e.g. the data plane DMZ tier 548 of FIG. 5), and a data plane data tier 750 (e.g. the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g. public Internet 554 of FIG. 5).

The Internet gateway 734 contained in the control plane VCN 716 and contained in the data plane VCN 718 can be communicatively coupled to a metadata management service 752 (e.g. the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
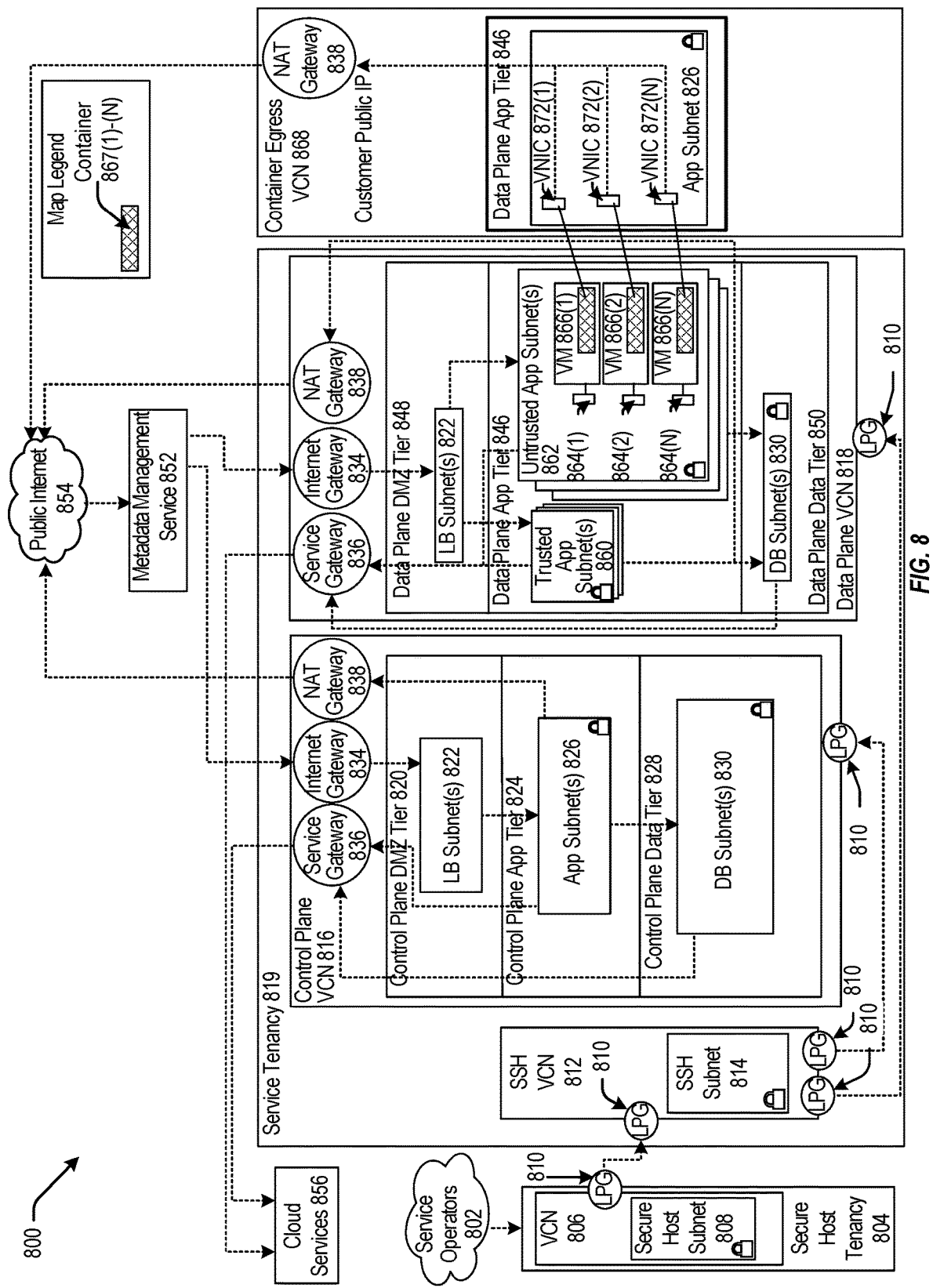
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 502 of FIG. 5) can be communicatively coupled to a secure host tenancy 804 (e.g. the secure host tenancy 504 of FIG. 5) that can include a virtual cloud network (VCN) 806 (e.g. the VCN 506 of FIG. 5) and a secure host subnet 808 (e.g. the secure host subnet 508 of FIG. 5). The VCN 806 can include an LPG 810 (e.g. the LPG 510 of FIG. 5) that can be communicatively coupled to an SSH VCN 812 (e.g. the SSH VCN 512 of FIG. 5) via an LPG 810 contained in the SSH VCN 812. The SSH VCN 812 can include an SSH subnet 814 (e.g. the SSH subnet 514 of FIG. 5), and the SSH VCN 812 can be communicatively coupled to a control plane VCN 816 (e.g. the control plane VCN 516 of FIG. 5) via an LPG 810 contained in the control plane VCN 816 and to a data plane VCN 818 (e.g. the data plane 518 of FIG. 5) via an LPG 810 contained in the data plane VCN 818. The control plane VCN 816 and the data plane VCN 818 can be contained in a service tenancy 819 (e.g. the service tenancy 519 of FIG. 5).

The control plane VCN 816 can include a control plane DMZ tier 820 (e.g. the control plane DMZ tier 520 of FIG. 5) that can include LB subnet(s) 822 (e.g. LB subnet(s) 522 of FIG. 5), a control plane app tier 824 (e.g. the control plane app tier 524 of FIG. 5) that can include app subnet(s) 826 (e.g. app subnet(s) 526 of FIG. 5), a control plane data tier 828 (e.g. the control plane data tier 528 of FIG. 5) that can include DB subnet(s) 830 (e.g. DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g. the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 5) and a network address translation (NAT) gateway 838 (e.g. the NAT gateway 538 of FIG. 5). The control plane VCN 816 can include the service gateway 836 and the NAT gateway 838.

The data plane VCN 818 can include a data plane app tier 846 (e.g. the data plane app tier 546 of FIG. 5), a data plane DMZ tier 848 (e.g. the data plane DMZ tier 548 of FIG. 5), and a data plane data tier 850 (e.g. the data plane data tier 550 of FIG. 5). The data plane DMZ tier 848 can include LB subnet(s) 822 that can be communicatively coupled to trusted app subnet(s) 860 (e.g. trusted app subnet(s) 760 of FIG. 7) and untrusted app subnet(s) 862 (e.g. untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g. public Internet 554 of FIG. 5).

The Internet gateway 834 contained in the control plane VCN 816 and contained in the data plane VCN 818 can be communicatively coupled to a metadata management service 852 (e.g. the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
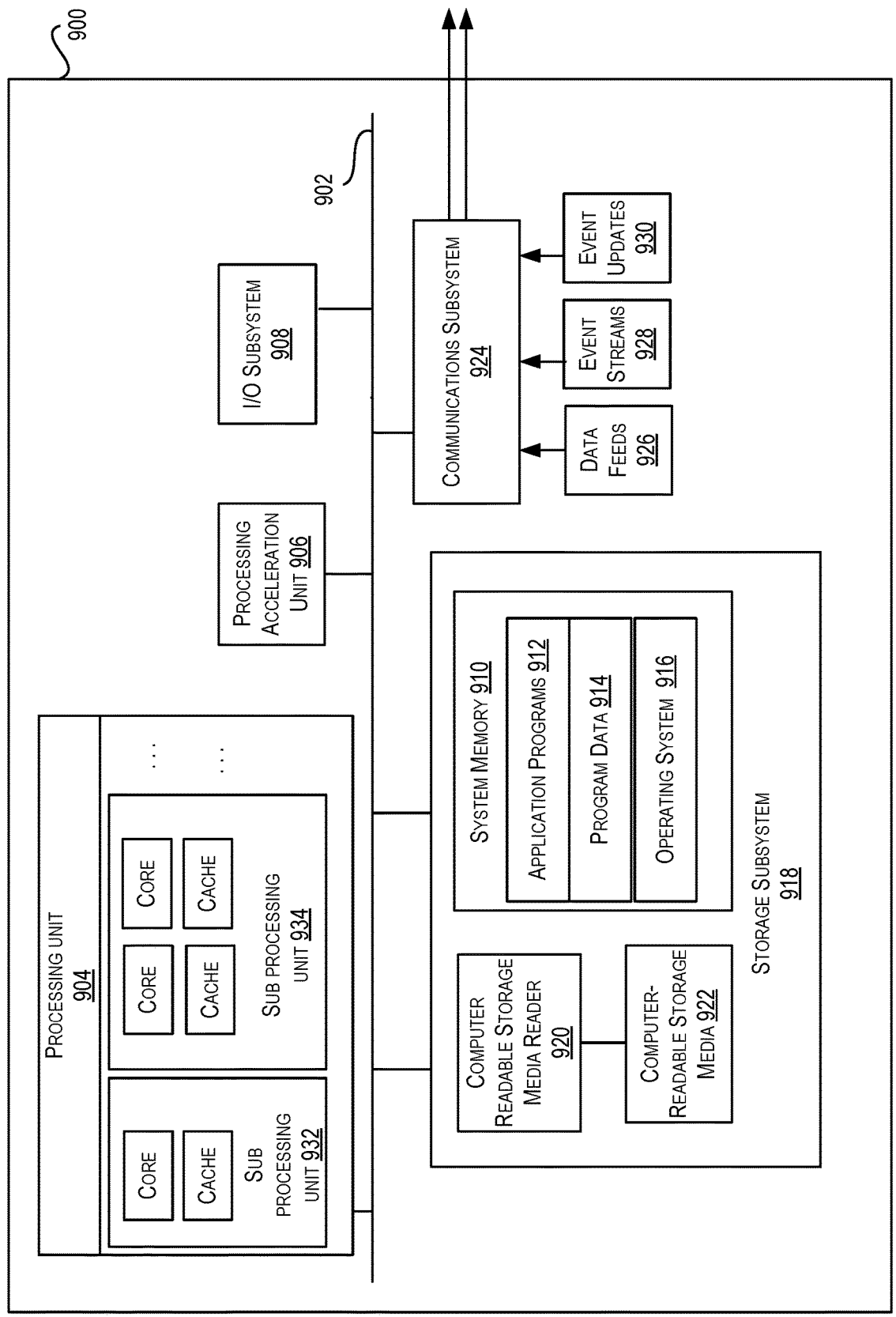
FIG. 9 is a block diagram illustrating an example computer system, according to at least one embodiment.

FIG. 9 illustrates an example computer system 900, in which various embodiments of the present disclosure may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 9 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    selecting with a load balancer in a cloud service provider infrastructure (CSPI) a server from a cluster of servers in the CSPI for processing a request received by the load balancer from an appliance in a customer data center associated with a customer, the request comprising a request to establish a connection between the appliance and an end point in the CSPI;
    establishing a connection between the selected server and the appliance in the customer data center;

receiving with the load balancer a client request from a client device to perform an operation on the appliance in the customer data center;

identifying the selected server having the established connection with the appliance in the customer data center; and communicating the client request to the appliance in the customer data center via the selected server.

2. The method of claim 1, further comprising: the load balancer selecting a processing server for processing the client request; and forwarding the client request to the processing server.

3. The method of claim 2, further comprising: receiving the client request with the processing server; and inspecting the client request with the processing server to identify the appliance and a data center corresponding to the client request.

4. The method of claim 3, further comprising storing information identifying the established connection between the selected server and the appliance in the customer data center.

5. The method of claim 4, wherein the information identifying the established connection between the selected server and the appliance in the customer data center is stored distributed cache accessible by the cluster of servers.

6. The method of claim 4, wherein the processing server identifies the selected server as having the established connection with the appliance in the customer data center based on the stored information.

7. The method of claim 6, further comprising generating with the processing server a redirect response redirecting the client request from the processing server to the selected server.

8. The method of claim 7, further comprising the load balancer sending the client request to the selected server subsequent to the redirect response.

9. The method of claim 8, further comprising receiving the client request from the load balancer at the selected server.

10. The method of claim 9, wherein the client request comprises a second client request generated by the client device in response to the redirect response.

11. The method of claim 10, wherein the load balancer sending the client request to the selected server subsequent to the redirect response comprises: the load balancer receiving the second client request from the client device; and the load balancer forwarding the second client request to the selected server.

12. The method of claim 11, wherein the load balancer forwards the second client request to the selected server based on endpoint identification information contained in the second client request.

13. The method of claim 12, wherein the endpoint identification information comprises information identifying a path to the selected server.

14. The method of claim 9, further comprising sending the client request from the selected server to the appliance within the customer data center.

15. The method of claim 6, further comprising determining based on the stored information that the processing server has the established connection with the appliance in the customer data center.

16. The method of claim 1, wherein the customer data center is an on-premise data center of the customer, wherein the customer subscribes to one or more services provided using the CSPI.

17. A non-transitory computer-readable memory storing a plurality of instructions executable by one or more processors, the plurality of instructions comprising instructions that when executed by the one or more processors cause the one or more processors to perform processing comprising:

select with a load balancer in a cloud service provider infrastructure (CSPI) a server from a cluster of servers in the CSPI for processing a request received by the load balancer from an appliance in a customer data center associated with a customer, the request comprising a request to establish a connection between the appliance and an end point in the CSPI;

establish a connection between the selected server and the appliance in the customer data center;

receive with the load balancer a client request from a client device to perform an operation on the appliance in the customer data center;

identify the selected server having the established connection with the appliance in the customer data center; and communicate the client request to the appliance in the customer data center via the selected server.

18. The non-transitory computer-readable memory of claim 17, wherein the customer data center is an on-premise data center of the customer, wherein the customer subscribes to one or more services provided using the CSPI.

19. A system comprising:

one or more processors; and a memory coupled to the one or more processors, the memory storing a plurality of instructions executable by the one or more processors, the plurality of instructions comprising instructions that when executed by the one or more processors cause the one or more processors to perform processing comprising:

select with a load balancer in a cloud service provider infrastructure (CSPI) a server from a cluster of servers in the CSPI for processing a request received by the load balancer from an appliance in a customer data center associated with a customer, the request comprising a request to establish a connection between the appliance and an end point in the CSPI;

establish a connection between the selected server and the appliance in the customer data center;

receive with the load balancer a client request from a client device to perform an operation on the appliance in the customer data center;

identify the selected server having the established connection with the appliance in the customer data center; and communicate the client request to the appliance in the customer data center via the selected.

20. The system of claim 19, wherein the customer data center is an on-premise data center of the customer, wherein the customer subscribes to one or more services provided using the CSPI.

* * * * *

UNITED STATES PATENT AND TRADEMARK OFFICE
CERTIFICATE OF CORRECTION

PATENT NO. : 12,047,473 B2
APPLICATION NO. : 18/209326
DATED : July 23, 2024
INVENTOR(S) : Sahoo et al.

It is certified that error appears in the above-identified patent and that said Letters Patent is hereby corrected as shown below:

In the Specification

In Column 1, Line 52, delete "CPSI" and insert -- CSPI --, therefor.

In Column 23, Lines 56-57, delete "computer readable" and insert -- computer-readable --, therefor.

In Column 24, Line 8, delete "flash-memory" and insert -- flash memory --, therefor.

In the Claims

In Column 28, Line 56, in Claim 19, delete "selected." and insert -- selected server. --, therefor.

Signed and Sealed this
Tenth Day of December, 2024

Katherine Kelly Vidal
*Director of the United States Patent and Trademark Office*